(12) United States Patent
Vignerol et al.

(10) Patent No.: US 11,560,966 B2
(45) Date of Patent: Jan. 24, 2023

(54) VALVE AND DEVICE FOR STORING AND DISPENSING PRESSURIZED FLUID

(71) Applicant: L'Air Liquide, Société Anonyme pour l'Etude et l'Exploitation des Procédés Georges Claude, Paris (FR)

(72) Inventors: Samuel Vignerol, Fontenay le Fleury (FR); Antoine Frenal, Ezanville (FR); Denis Muller, Rueil Malmaison (FR); Hervé Paoli, Rueil Malmaison (FR); Olivier Ondo, Palaiseau (FR); Morgan Lamiable, Metzer Visse (FR); Johan Broechler, Villerupt (FR); Claudio Di Filippo, Noisseville (FR)

(73) Assignee: L'Air Liquide, Société Anonyme pour l'Etude et l'Exploitation des Procédés Georges Claude, Paris (FR)

(*) Notice: Subject to any disclaimer, the term of this patent is extended or adjusted under 35 U.S.C. 154(b) by 302 days.

(21) Appl. No.: 16/652,922

(22) PCT Filed: Aug. 2, 2018

(86) PCT No.: PCT/FR2018/051994
§ 371 (c)(1),
(2) Date: Apr. 1, 2020

(87) PCT Pub. No.: WO2019/068970
PCT Pub. Date: Apr. 11, 2019

(65) Prior Publication Data
US 2020/0240524 A1   Jul. 30, 2020

(30) Foreign Application Priority Data
Oct. 5, 2017 (FR) ........................... 1701024
Oct. 5, 2017 (FR) ........................... 1701025

(51) Int. Cl.
*F16K 31/524* (2006.01)
*F15B 20/00* (2006.01)
(Continued)

(52) U.S. Cl.
CPC ........ *F16K 31/52408* (2013.01); *F15B 20/00* (2013.01); *F16K 1/302* (2013.01);
(Continued)

(58) Field of Classification Search
CPC ........ F16K 1/302; F16K 1/443; F16K 31/602; F16K 35/025; F16K 31/52408
See application file for complete search history.

(56) References Cited

U.S. PATENT DOCUMENTS

| 1,160,285 A | 4/1915 | Hobbs et al. |
| 1,944,456 A | 1/1934 | Pearson |

(Continued)

FOREIGN PATENT DOCUMENTS

| EP | 3 062 005 | 8/2016 |
| FR | 2 790 299 | 9/2000 |

(Continued)

OTHER PUBLICATIONS

International Search Report and Written Opinion for corresponding PCT/FR2018/051994, dated Dec. 19, 2018.
(Continued)

*Primary Examiner* — Reinaldo Sanchez-Medina
*Assistant Examiner* — Nicole Gardner
(74) *Attorney, Agent, or Firm* — Elwood L. Haynes

(57) ABSTRACT

A valve for pressurized fluid, including a body having a front face and a rear face and housing an internal fluid circuit having an upstream end configured to be placed in communication with a reserve of pressurized fluid and a downstream end configured to be placed in communication with a user of fluid, the circuit including a collection of valve
(Continued)

shutter(s) including at least one shutoff valve shutter for closing or opening the circuit, the valve comprising a member for manually controlling the collection of valve shutter(s).

13 Claims, 4 Drawing Sheets

(51) Int. Cl.
| | |
|---|---|
| *F16K 31/60* | (2006.01) |
| *F16K 1/44* | (2006.01) |
| *F16K 35/02* | (2006.01) |
| *F16K 35/14* | (2006.01) |
| *F17C 13/04* | (2006.01) |
| *F16K 1/30* | (2006.01) |
| *F17C 1/00* | (2006.01) |
| *F15B 15/26* | (2006.01) |

(52) U.S. Cl.
CPC ............ *F16K 1/303* (2013.01); *F16K 1/304* (2013.01); *F16K 1/443* (2013.01); *F16K 31/602* (2013.01); *F16K 35/025* (2013.01); *F16K 35/14* (2013.01); *F17C 1/00* (2013.01); *F17C 13/04* (2013.01); *F15B 2015/267* (2013.01); *F17C 2201/0109* (2013.01); *F17C 2201/032* (2013.01); *F17C 2201/058* (2013.01); *F17C 2203/0617* (2013.01); *F17C 2205/035* (2013.01); *F17C 2205/0326* (2013.01); *F17C 2205/0329* (2013.01); *F17C 2205/0385* (2013.01); *F17C 2205/0394* (2013.01); *F17C 2221/011* (2013.01); *F17C 2223/0123* (2013.01); *F17C 2223/036* (2013.01); *F17C 2223/043* (2013.01); *F17C 2227/044* (2013.01); *F17C 2250/043* (2013.01); *F17C 2260/021* (2013.01); *F17C 2260/044* (2013.01); *F17C 2260/056* (2013.01)

(56) References Cited

U.S. PATENT DOCUMENTS

| | | | |
|---|---|---|---|
| 2,709,452 | A | 4/1951 | Calabrese |
| 3,737,140 | A | 6/1973 | Toth |
| 5,836,352 | A * | 11/1998 | Nimberger ............. F16K 1/443 137/614.19 |
| 6,035,463 | A | 3/2000 | Pawelzik et al. |
| 6,086,045 | A * | 7/2000 | Moon ................... F16K 35/025 251/114 |
| 2004/0094736 | A1* | 5/2004 | Yui ......................... F16K 31/52 251/103 |
| 2004/0231729 | A1 | 11/2004 | Lang et al. |
| 2005/0173007 | A1 | 8/2005 | Cannet et al. |
| 2006/0175569 | A1 | 8/2006 | Henson |
| 2014/0048169 | A1 | 2/2014 | Pisot et al. |
| 2016/0153617 | A1 | 6/2016 | Mellors |

FOREIGN PATENT DOCUMENTS

| | | |
|---|---|---|
| FR | 2 793 297 | 11/2000 |
| FR | 2 828 922 | 2/2003 |
| FR | 2 840 664 | 12/2003 |
| FR | 2 974 402 | 10/2012 |
| GB | 441 279 | 7/1924 |
| GB | 834 759 | 8/1958 |
| WO | WO 2016 146743 | 3/2016 |

OTHER PUBLICATIONS

International Search Report and Written Opinion for related PCT/FR2018/052001, dated Nov. 20, 2018.
International Search Report and Written Opinion for related PCT/FR2018/052005, dated Nov. 20, 2018.
International Search Report and Written Opinion for related PCT/FR2018/052002, dated Nov. 23, 2018.
International Search Report and Written Opinion for related PCT/FR2018/052003, dated Nov. 23, 2018.
International Search Report and Written Opinion for related PCT/FR2018/051995, dated Dec. 19, 2018.
International Search Report and Written Opinion for related PCT/FR2018/052000, dated Dec. 19, 2018.

* cited by examiner

VALVE AND DEVICE FOR STORING AND DISPENSING PRESSURIZED FLUID

CROSS REFERENCE TO RELATED APPLICATIONS

This application is a 371 of International Application PCT/FR2018/051994, filed Aug. 2, 2018, which claims priority to French Patent Application Nos. 1701024 and 1701025, both filed Oct. 5, 2017, the entire contents of which are incorporated herein by reference.

BACKGROUND

The invention relates to a valve and to a device for storing and dispensing pressurized fluid.

The invention relates more particularly to a valve for pressurized fluid, comprising a body having a front face and a rear face and housing an internal fluid circuit having an upstream end intended to be placed in communication with a reserve of pressurized fluid and a downstream end intended to be placed in communication with a user of fluid, the circuit comprising a collection of valve shutter(s) comprising at least one shutoff valve shutter for closing or opening the circuit, the valve comprising a member for manually controlling the collection of valve shutter(s), the control member being mounted on the body so as to be movable between a rest position, in which the collection of valve shutter(s) is in a position in which the circuit is closed, and an active position, in which the control member actuates the collection of valve shutter(s) into a position in which the circuit is open with a first bore section, the valve having a mechanism for locking the control member in its rest position, the locking mechanism comprising a locking lever provided with an end for grasping, the locking lever being able to move on the body between a locked first position, which locks the control member to prevent it from moving from its rest position toward its active position, and an unlocked second position, in which the control member is unlocked, allowing it to move from its rest position toward its active position, wherein, in the locked first position of the locking lever, the end for grasping of the locking lever is disposed along or in a manner facing the front face of the body of the valve at a first distance from the front face of the body of the valve.

For safety reasons, it is known practice to provide a mechanism for locking the member for manually controlling the opening of an isolation valve shutter of a valve for (a) pressurized gas cylinder(s) (see for example FR2793297A1).

A risk of such a mechanism may be untimely actuation. For example, when the cylinder provided with such a valve is transported, dropped or handled, a protruding object (rectilinear pin or the like) may actuate this mechanism, which unlocks the control member. This untimely moving of the locking/unlocking member is all the more hazardous when the actuation thereof allows the valve to be pre-opened so as to release gas even before the control member is moved.

SUMMARY

It is an aim of the present invention to remedy all or some of the above-mentioned drawbacks of the prior art.

To this end, the valve according to the invention, which is otherwise in accordance with the generic definition thereof given in the above preamble, is essentially characterized in that, in the unlocked second position of the locking lever, the end for grasping is spaced apart from the front face of the body of the valve by a second distance greater than the first distance, and in that the body of the valve has a concealing portion for concealing at least the terminal end for grasping of the lever, forming a barrier between the rear face of the body of the valve and the end for grasping of the lever, in order to prevent or limit the possibility of a rectilinear object being able to push the locking lever from its locked position toward its unlocked position from the rear of the valve at the terminal end for grasping.

The shape of the body of the valve (the valve itself or a shell surrounding it) thus makes it possible to block or deflect the path of the impinging object so that it does not come into contact with the lever.

This geometry can cooperate advantageously with the geometry of a protective bonnet in order to further reduce undesired access to the locking lever.

Furthermore, embodiments of the invention may include one or more of the following features:

- the rear face of the concealing portion is curved or inclined in the direction of the front face of the valve as it becomes closer to one lateral end of the body of the valve,
- the rear face of the end for grasping of the locking lever, that is to say the face that faces the front face of the body of the valve, is curved or inclined in the direction of the front of the valve as it becomes closer to the lateral end of the valve, in order to laterally deflect a rectilinear object that might impinge on the locking lever from behind at the end for grasping of the locking lever,
- the concealing portion is in one piece with a portion of the body of the valve delimiting the internal circuit and/or is formed by a shell attached to the portion of the body of the valve delimiting the internal circuit,
- the control member comprises at least one of the following: a lever articulated to the body, a push-button to be moved in translation, a rotary actuator such as a handwheel or a knob,
- the control member comprises a lever articulated to the body and comprising an end for grasping, notably a terminal end for grasping, wherein, in its rest position, the end for grasping of the control member is disposed along or in a manner facing the front face of the body of the valve, in its active position, the end for grasping of the control member is spaced apart from the body of the valve, and in that, when the control member is in its rest position and the locking lever is in the first position, the ends for grasping of the control member and of the locking lever are adjacent to one another,
- the control member and the locking lever are articulated about respective, distinct or coincident rotary pins,
- the control member and the locking lever are articulated about parallel rotary pins, and in that the control member and the locking lever move in rotation in one and the same plane or in parallel adjacent planes,
- when the control member is in its rest position and the locking lever is in the first position, a portion of the locking lever is situated between the front face of the body of the valve and a portion of the control member, meaning that, in the front/rear direction of the valve, the locking lever is partially concealed by the control member except for its portion for grasping,
- in its unlocked second position, the locking lever actuates the collection of valve shutter(s) into a position in which the circuit is open with a second bore section, the second bore section is smaller than the first bore section, the collection of valve shutter(s) has two distinct shut-off valve shutters that are able to move with respect to respective seats and, in the open position, respectively define the two distinct bore sections, the two valve shutters being controlled by the control member and by the actuator, respectively, the valve has a return member for returning the actuator toward its locked first position, the valve has a retaining mechanism providing stable retention of the control member at least in its active position, the valve has a coupling mechanism that couples the movement of the control member and of the actuator when the control member is moved from its active position toward its rest position and/or from its rest position toward its active position, the coupling mechanism automatically moving the actuator when the control member is moved, the two distinct shut-off valve shutters are disposed in series in one and the same line of the circuit, the two shutoff valve shutters are controlled by at least one mobile pushrod controlled by the control member and by the actuator, the movement of the actuator from its locked first position toward its unlocked second position moves the pushrod over a first travel that actuates the opening of (a) first valve shutter(s) into an open position with the second bore section for the circuit; the subsequent movement of the control member from its rest position toward its active position moves the pushrod over a second travel that actuates the opening of the second valve shutter into a position in which the circuit is open with the first bore section, the mechanism for locking the control member in its rest position comprises a mobile mechanical stop, the mechanism for locking the control member in its rest position acts on a cam integral with the control lever, the mechanism for locking the control member in its rest position comprises a mechanical stop between a profile of the cam of the control member and a mobile member of a mechanism transmitting movement between the cam and the collection of valve shutter(s), the two levers are articulated to the body and each comprise a respective cam that has a respective cam profile and cooperates with at least one mobile pushrod for controlling the collection of shutoff valve shutter(s).

The invention also relates to a device for storing and dispensing pressurized fluid, comprising a gas reservoir provided with a valve according to any one of the features above or below and a protective bonnet for protecting the valve that is disposed around the valve, the bonnet comprising at least one rear opening for accessing the valve via its rear face, wherein, in the first position of the locking lever, direct access to the end for grasping of the lever via the rear opening with a rectilinear object is possible through a window defined by a direction offset by an angle of between 20 and 60° with respect to the front/rear direction of the valve, said window having a width less than or equal to 3 cm.

For example, when the locking lever is in the first position, the distance of direct access to the end for grasping of the lever through the rear opening is between 5 cm and 20 cm.

The invention also relates to a reservoir or collection of reservoirs for pressurized fluid, notably pressurized gas, comprising a valve according to any one of the features above or below.

The invention may also relate to any alternative device or method comprising any combination of the features above or below within the scope of the claims.

BRIEF DESCRIPTION OF THE DRAWINGS

For a further understanding of the nature and objects for the present invention, reference should be made to the following detailed description, taken in conjunction with the accompanying drawings, in which like elements are given the same or analogous reference numbers and wherein.

DETAILED DESCRIPTION OF PREFERRED EMBODIMENTS

Figure 1:
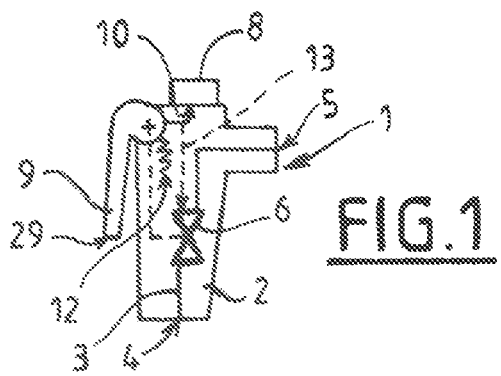
FIG. 1 shows a schematic and partial view in section, illustrating the structure and operation of a first possible exemplary embodiment of the invention.

The valve 1 illustrated in the figures comprises in the conventional way a body 2 housing a fluid circuit 3 having an upstream end 4 intended to be placed in communication with a reserve of pressurized fluid and a downstream end 5 intended to be placed in communication with a user of fluid.

The upstream end 4 may be connected to a pressurized gas cylinder 11 (cf. FIGS. 8 to 10) or to circuitry connected to a pressurized-gas cylinder or several cylinders (rack of cylinders for example). For this purpose, the corresponding end of the body 2 of the valve 1 may be threaded.

The downstream end 5 opens for example onto an outlet connector.

The circuit 3 comprises a collection of valve shutter(s) comprising at least one shutoff valve shutter 6 allowing the circuit 3 to be closed or opened (isolation valve).

The valve 1 comprises a control member 8 for manually controlling the collection of valve shutter(s) 6.

The control member 8 is mounted on the valve 1 so as to be movable between a rest position (FIGS. 1, 2, 3, 5, 6, 7 and 9), in which the collection of valve shutter(s) 6 remains closed (for example via a return member such as a spring), this corresponding to the circuit 3 being closed, and an active position (cf. FIG. 10), in which the control member 8 actuates the collection of valve shutter(s) 6 into a position in which the circuit 3 is open with a first bore section S1 (notably fully open).

In the example in FIG. 1, the control member 8 is a push-button.

In the example in the other figures, the control member 8 is a lever articulated to the valve. The control member 8 could, however, be any type of member (lever, button, rotary selector, etc.) situated notably on a distinct face of the body 2 of the valve 1.

Figure 5:
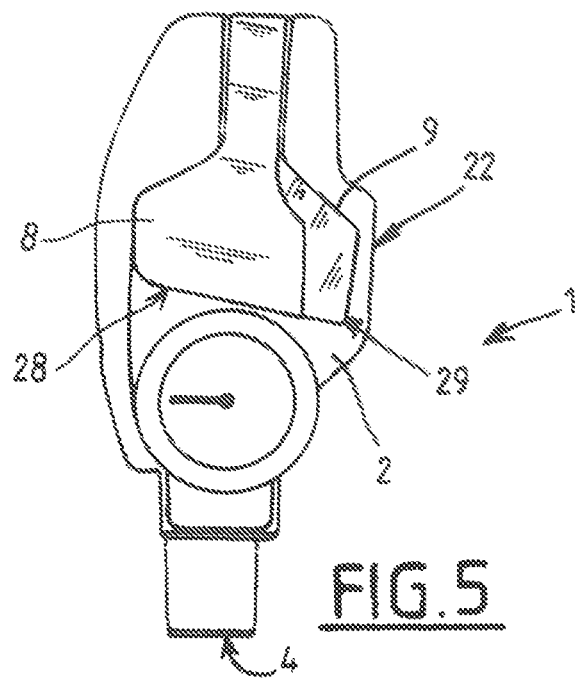
FIG. 5 shows a schematic and partial face-on view, illustrating another exemplary embodiment of a valve according to the invention.

The body 2 of the valve comprises a front face (cf. FIG. 5) and a rear face (cf. FIG. 6) and lateral edges or ends (cf. the lateral ends of the valve in FIG. 5).

As can be seen notably in FIGS. 6, 7, 9 and 11, the outlet connector 5 may be situated on the rear face of the body 2 of the valve 1.

The valve 1 has a locking mechanism 9, 10 for locking the control member 8 in its rest position.

This locking mechanism 9, 10 comprises a locking lever 9 provided with an end 29 for grasping, notably a terminal end.

The locking lever 9 is able to move on the body 2 between a locked first position, which locks the control member 8 to prevent it from moving from its rest position toward its active position (for example via a stop 10), and an unlocked second position, in which the control member 8 is unlocked, allowing it to move from its rest position toward its active position (for example stop 10 retracted).

Figure 6:
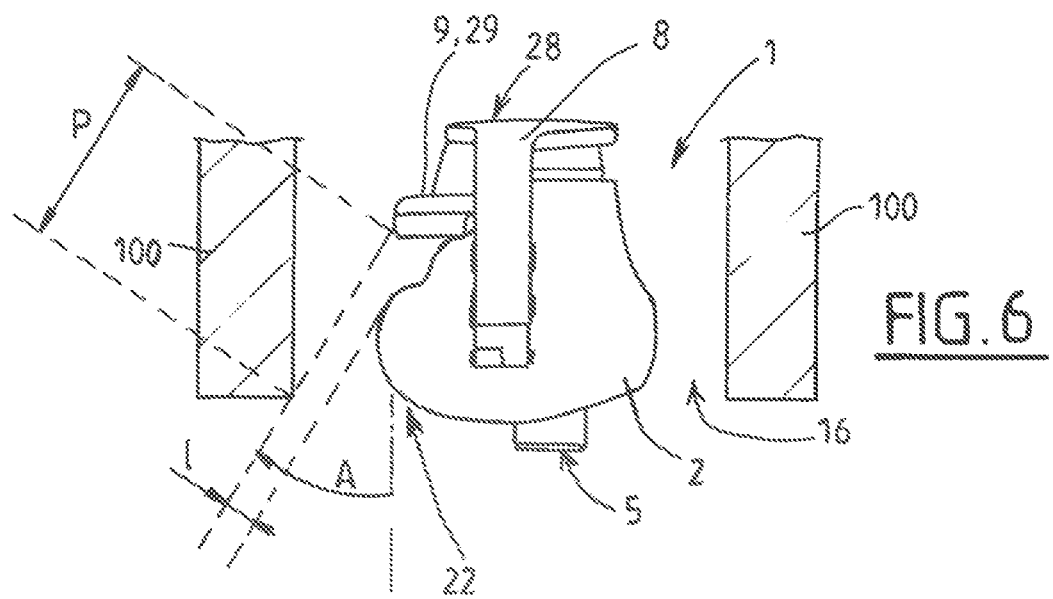
FIG. 6 shows a schematic and partially sectional top view of the valve in FIG. 5 associated with a protective bonnet.
Figure 7:
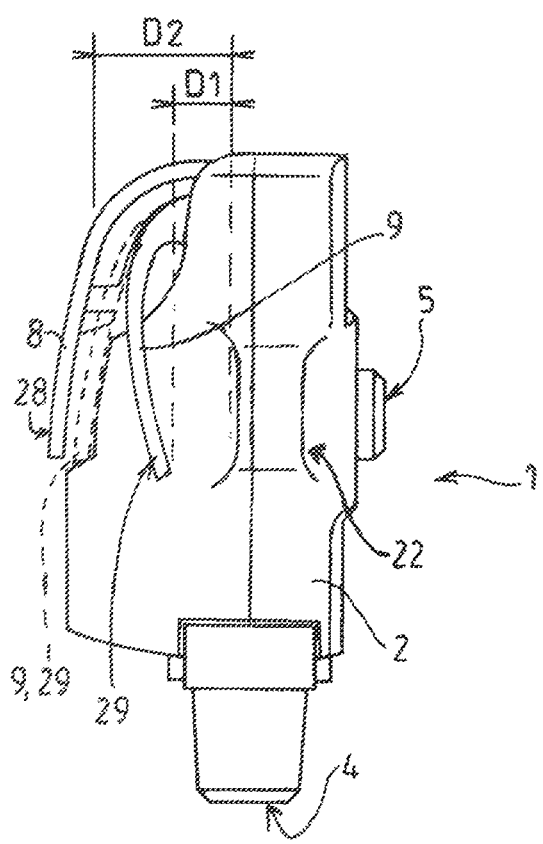
FIG. 7 shows a schematic and partial side (lateral) view of the valve in FIG. 5.

In the locked first position of the locking lever 9 (cf. FIGS. 1, 2, 5, 6, 7 and 9), the terminal end 29 for grasping of the locking lever 9 is disposed for example along or in a manner facing the front face of the body of the valve 1 at a first distance D1 from the front face of the body of the valve (cf. FIG. 7). This first distance D1 may be between zero and 4 cm for example, notably between 1 and 3 cm or between 1 and 2 cm.

When the locking lever 9 is in its unlocked second position, the terminal end 29 for grasping may be spaced apart from the front face of the body of the valve 1 by a second distance D2 greater than the first distance (cf. FIG. 7, dotted-line position), for example greater by 1 to 5 cm. This second distance D2 may be between 1 and 6 cm for example, notably between 3 and 5 cm. For example, when the locking lever 9 is in its unlocked second position, the terminal end 29 for grasping of the locking lever 9 arrives at or close to the terminal end 28 of the control lever 8 (in the front/rear direction).

Thus, in order to actuate the control member 8, the operator needs to move the locking lever 9 beforehand (or simultaneously). In order to do that, the user may use a finger to pull the terminal end 29 for grasping forward so as to move the locking lever 9 away from the body 2 of the valve.

According to an advantageous particular feature, the body 2 of the valve has a concealing portion 22 for concealing at least the terminal end 29 for grasping of the locking lever 9.

This concealing portion 22 forms a barrier between the rear face of the body of the valve and the terminal end 29 for grasping of the lever 9, so as to prevent or limit the possibility of a rectilinear object being able to push the locking lever 9 from the rear of the valve at the terminal end 29 for grasping (in order to move it from its locked position toward its unlocked position).

Figure 8:
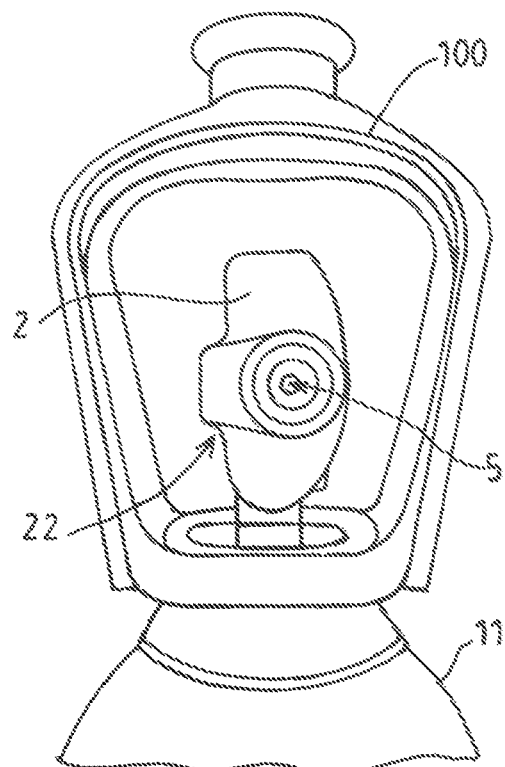
FIG. 8 shows a schematic and partial rear view of the valve in FIG. 5, mounted on a gas reservoir and protected by a bonnet.
Figure 9:
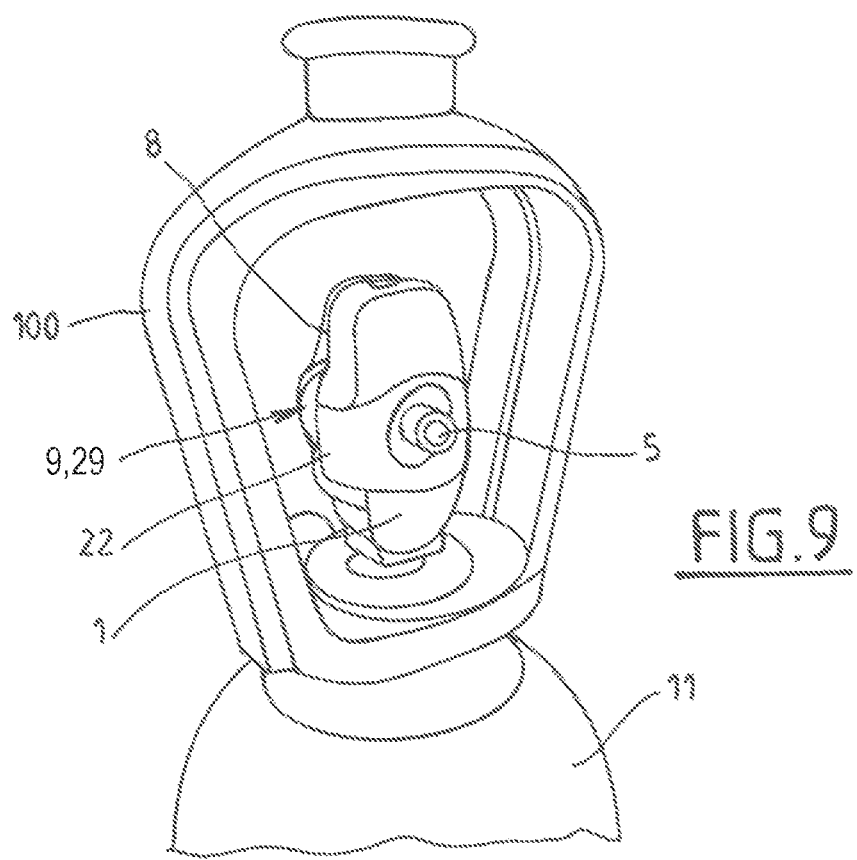
FIG. 9 shows a rear view at a slight angle of the valve in FIG. 5, mounted on its gas reservoir and protected by its bonnet.

Thus, as can be seen in FIG. 8 in particular, in a rear view, the locking lever 9 is hidden by the body 2 of the valve 1 and more particularly by the concealing portion 22, which may form a lateral boss on the body 2 of the valve (cf. FIG. 5 also).

The concealing portion 22 may be in one piece with the material of the body of the valve delimiting the internal circuit 3. This means that the concealing portion 22 may be in one piece with the metal (for example brass) that structurally forms the valve and houses its internal components. Of course, as a variant, and as shown in FIGS. 5 to 10, this concealing portion 22 may be formed a by shell or a covering or a member attached to the (metallic) body of the valve delimiting the internal circuit (3) permanently or removably. In other words, this concealing portion 22 could be removed if this outer shell were removed. Thus, when it comes to defining the concealing portion 22, the term "body" of the valve in this case refers to the envelope of the valve defining the exterior contours of the valve.

The concealing portion 22 prevents or limits the risk of inadvertent opening from the rear (the terms front/rear and the front/rear direction or the lateral directions relate to the front and rear faces of the valve).

As can be seen in FIG. 6, the rear face of the concealing portion 22 may be curved or inclined in the direction of the front face of the valve as it extends toward one lateral end of the body of the valve. This allows an object that might impinge on the rear face of the body 2 of the valve to be deflected laterally.

Similarly, the rear face of the terminal end 29 for grasping of the locking lever 9, that is to say the face that is situated in a manner facing the front face of the body 2 of the valve 1, may be curved or inclined in the direction of the front of the valve as it extends toward the lateral end of the valve. This may also play a part in laterally deflecting the end of an object that might impinge on the locking lever 9 from the rear in the region of the terminal end 29 for grasping of the locking lever 9. This limits the possibility of an object pressing on this surface in a sustained manner.

Preferably, at least the locking lever 9 may become positioned in a depression in the body 2, making it even less accessible from the rear face.

Of course, as a variant, the lever(s) 9, 8 could be housed in one or more hollow depressions in the front face of the body 2 of the valve, preventing any access from the rear (whatever the angle of incidence).

FIGS. 6 and 8 to 10 illustrate the instance in which the valve is mounted on a reservoir 11 and protected by a protective bonnet 100. The bonnet 100 (for example in the form of a bow) has at least one rear opening 16 for accessing the valve via its rear face. Preferably, when the locking lever 9 is in the first position, direct access to the terminal end 29 for grasping of the lever 9 via the rear opening 16 with a rectilinear object (a pin or a rod for example) is not possible or is possible only through a narrow window defined by a direction offset by an angle (A) with respect to the front/rear direction of the valve. The angle A is for example between 20 and 60° (or 20 to 40° or between 20 and 50°), depending notably on the angle of orientation of the bonnet with respect to the front/rear direction of the valve.

In addition, said window preferably has a width l less than or equal to 3 cm (cf. FIG. 6, where two lateral uprights of the bonnet 100 are shown schematically and in horizontal section).

In addition, preferably, when the locking lever 9 is in the first position, the distance P of direct access to the terminal end 29 for grasping of the lever 9 through the rear opening 16 is between 5 cm or 6 cm and 20 cm, and preferably between 8 and 15 cm at least.

In other words, the relative geometries of the concealing portion 22 and of the bonnet 100 make it impossible or near-impossible to activate the locking lever 9 accidentally from the rear. The accessible zone is effectively extremely small or zero. A very precise angle as defined above combined with a very precise shape (width and length) of object would be needed for example in order for it to be possible to actuate it from the rear.

The possible shapes are necessarily slender, and if the object is too short (for example less than 6 to 8 cm), it will not reach the lever 9. In addition, if the object is too long, it becomes very difficult or impossible to maintain stable pressure on the locking lever 9.

The cross section of the object needs in particular to be small, because otherwise it will not fit through the gap (l) between the bonnet 100 and the concealing portion 22 of the body 2 (gap for example equal to 2 cm in width).

If the control member 8 is also a lever, for example adjacent to the locking lever 9, the concealing portion 22 also has to conceal the control lever 8.

The control member 8 and the locking lever 9 may be articulated about distinct or coincident respective rotary pins 21, 19. Similarly, the control member 8 and the locking lever 9 may be articulated about parallel rotary pins 21, 19 and the two levers 8, 9 may rotate in one and the same plane or in parallel adjacent planes (cf. FIGS. 7 and 10).

As illustrated in FIGS. 5 to 7 in particular, when the control member 8 is in its rest position and the locking lever 9 is in the first position, a portion of the locking lever 9 is preferably situated between the front face of the body of the valve and a portion of the control member 8. In other words, in the front/rear direction of the valve, the locking lever 9 may be partially concealed at the front face by the control member 8, except for its terminal portion 29 for grasping, which projects laterally with respect to the control member 8.

Thus, as illustrated in the embodiment in FIGS. 5 to 10, the control member 8 may comprise a lever articulated to the body and comprising a terminal end for grasping. In its rest position, the terminal end for grasping of the control member 8 is for example disposed along or in a manner facing the front face of the body of the valve 1 (cf. FIGS. 5 to 7 and 10).

In its rest position, the terminal end 28 for grasping of the control member 8 is for example spaced apart from the front face of the body 2 of the valve by a distance of between 3 and 5 cm for example.

In its unlocked second position, the terminal end 29 of the locking lever 9 may be spaced apart from the front face of the body of the valve 1 by a second distance D2 greater than the first distance (cf. FIG. 7, dotted-line position). This second distance D2 may be between 1 and 6 cm for example, notably between 3 and 5 cm.

Figure 10:
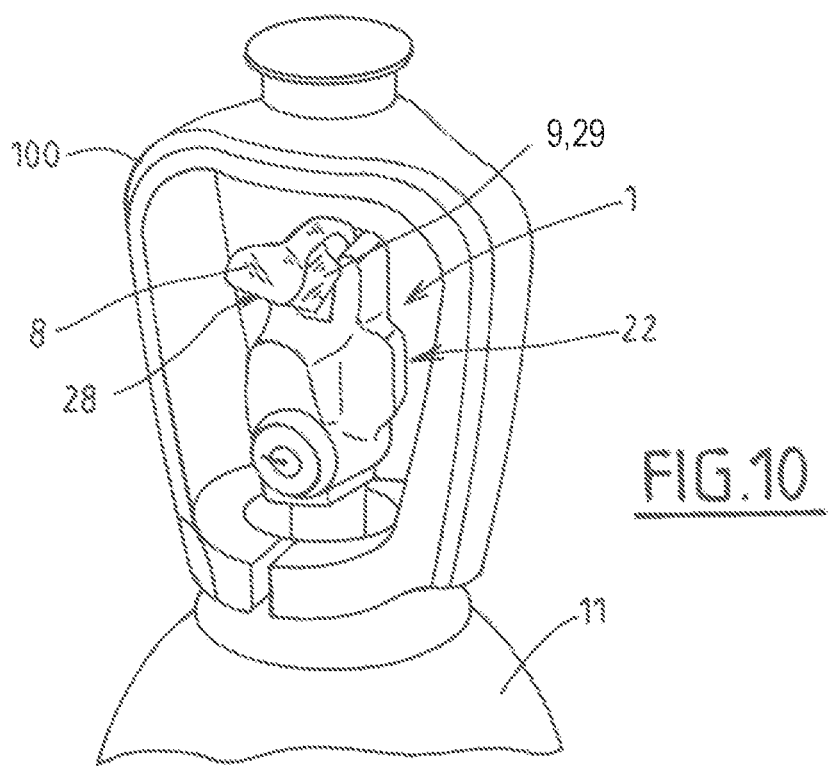
FIG. 10 shows a front view at an angle of the valve in FIG. 5, mounted on its gas reservoir and protected by its bonnet, in an open configuration.

In its active position, the terminal end 28 for grasping of the control member 8 is spaced apart from the body of the valve (cf. FIG. 10). In its active position, the control member 8 may be substantially horizontal, that is to say substantially perpendicular to the front face of the body 2 of the valve.

When the control member 8 is in its rest position and the locking lever 9 is in the first position, the terminal ends 28, 29 for grasping of the control member 8 and of the locking lever 9 may be adjacent and offset laterally.

This allows the user to pull/lift the locking lever 9 toward himself in order to release the control member 8. The unlocked control member 8 may in turn be pulled/lifted (cf. FIG. 10).

Preferably, when the control member 8 is in its rest position and the locking lever 9 is in its first position, the terminal end 29 for grasping may be set back slightly toward the rear compared with the terminal end 28 for grasping of the control member 8, notably set back by a few millimeters to a few centimeters, for example one to three centimeters for example (cf. FIG. 7).

For example, when the locking lever 9 is moved (pulled) into its second position, its terminal end 29 for grasping arrives at the same level (toward the front) as the terminal end for grasping of the control member 8.

Next, the control member 8 may be moved toward its active position (and possibly the locking lever 9 with it, cf. FIG. 10).

According to one possible advantageous particular feature, in its unlocked second position (cf. FIG. 7, dotted line), the locking lever 9 actuates the collection of valve shutter(s) 6, 7 into a position in which the circuit 3 is open with a second bore section S2 (partially open) that is preferably smaller than the first bore section S1.

Preferably, the second bore section S2 is smaller than the first bore section S1 (the corresponding withdrawal flow rates are thus distinct). For example, the ratio S2/S1 between the second bore section S2 and the first bore section S1 is between 1/100 and 1/20, and preferably between 1/80 and 1/30. Thus, in order for it to be possible to fully open the circuit 3 of the valve 1 using the lever 8, the user needs to actuate the distinct locking lever 9 beforehand, which unlocks the control lever 8 and partially opens the circuit.

The two degrees of opening S1, S2 of the circuit 3 may be achieved by a single valve shutter 6 having two respective open positions (cf. FIG. 1). Preferably, however, the two degrees of opening (S1, S2) are achieved via two distinct valve shutters 6, 7 (cf. FIGS. 2 and 3).

Figure 2:
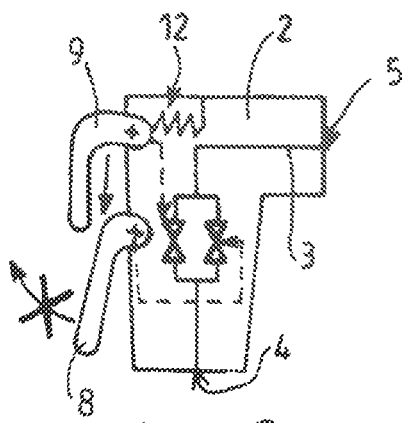
FIG. 2 shows a schematic and partial view in section, illustrating the structure and operation of a second possible exemplary embodiment of the invention in a configuration of use.
Figure 3:
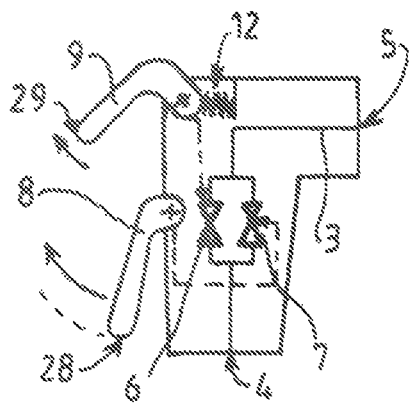
FIG. 3 shows a schematic and partial view in section, illustrating the structure and operation of a second possible exemplary embodiment of the invention in a configuration of use.

For example, as illustrated in FIGS. 2 and 3, the valve 1 may have two distinct shutoff valve shutters 6, 7 that are able to move with respect to respective seats and respectively define, according to their sequence of opening (one 6 open and then both 6, 7 open), the two distinct bore sections S2, S1.

Figure 11:
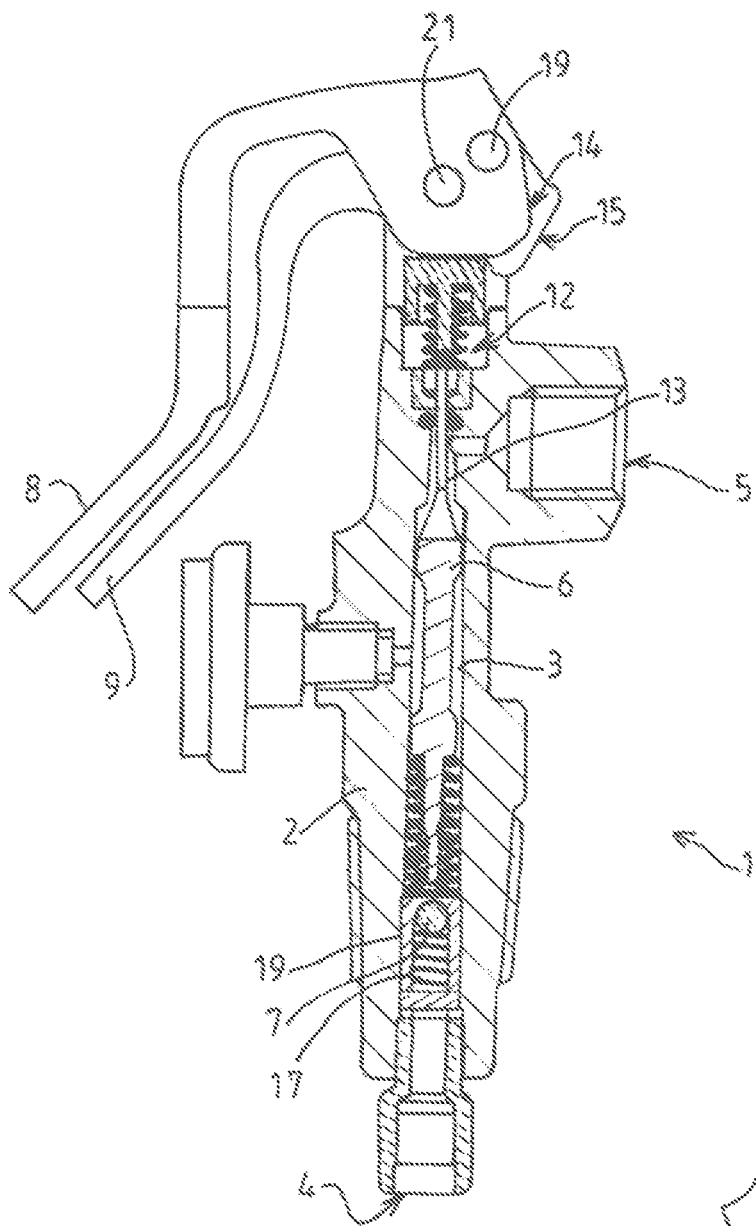
FIG. 11 shows a schematic and partial view in section, illustrating the structure and operation of another possible exemplary embodiment of the invention.

The two distinct shutoff valve shutters 6, 7 could be disposed in series in the circuit 3 (cf. FIG. 11). This first valve shutter 6 is for example able to move in translation with respect to a seat and forced toward the seat. In the closed position, the first valve shutter 6 may close the circuit in a sealed manner. In the closed position, the second valve shutter 7 closes the circuit 3 in a non-sealed manner. In other words, the second valve shutter 7 comprises a calibrated orifice that defines the second bore section S2 of the circuit 3.

The second valve shutter 7 comprises for example a ball 7 pushed toward a seat by a spring 17. For example, the ball 7 bears in a non-sealing manner against a seat (for example a bushing) with a predetermined spacing (bore section S2).

The passage (second bore section S2) between the ball 7 and the seat (bushing) can be obtained by impairing the line of sealing between the ball and its seat by broaching, or by a stroke with a saw or other tool on the ball or on its seat. It is possible for the ball 7 not to be perfectly cylindrical (faceted ball, porous ball, or ball of any other shape that allows the gas to pass at a limited flow rate).

Another alternative solution is to place a calibrated orifice in parallel with this second valve shutter 7 in order to provide the limited passage of gas. Alternatively, this calibrated orifice may pass through the body of the valve shutter 7.

Actuation of the locking lever 9 may move a movement transmission mechanism by a first travel, which in its turn moves the first valve shutter 6, which opens the circuit 3 at the first valve shutter 6. The gas which is allowed to pass through the calibrated orifice of the second valve shutter 7 can thus escape toward the second end 5 of the circuit 3. The gas coming from the first end 4 of the circuit 3 effectively passes between the ball 7 and the bushing 19 and then between the body 2 and the valve shutter 6 and can leave the valve 1.

The locking system of the control lever 8 can be located at a cam 14 integral with this lever.

Figure 12:
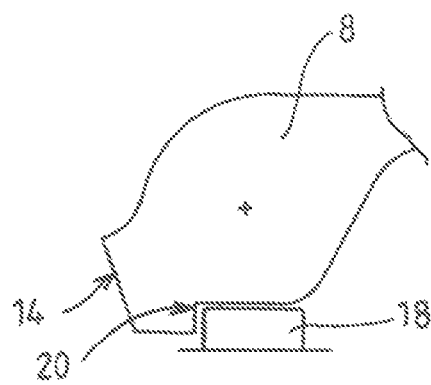
FIG. 12 shows an enlarged view in section of a detail of FIG. 11.

For example, the profile of the cam 14 of the control lever 8 may have a shape 20 that comes into abutment with a complementary shape belonging to the movement transmission mechanism (and notably the end of a pushrod 18, cf. FIG. 12). In the raised position (actuator 9 in the locked position, cf. FIG. 6 or 2), the movement transmission mechanism (and notably the end of a pushrod 18) forms a mechanical stop that prevents the control lever 8 from rotating.

In the lowered position (actuator 9 in the unlocked position, cf. dotted line in FIG. 7 or 3), the movement transmission mechanism (and notably the end of a pushrod 18) is retracted and no longer forms a mechanical stop that prevents the control lever 8 from rotating.

At the end of this first travel, the control lever 8 is thus unlocked and a reduced flow rate of gas is released.

This first travel thus allows the pushrod 18 to be positioned beyond an angle of abutment at the profile 20 of the cam 14.

The control lever 8 can then be pivoted in turn in order to move the mechanism 18, 13 a little further (second travel). This second travel allows the second valve shutter 7 (ball) to be moved off its seat (via the end of the first valve shutter 6). In this configuration, the circuit 3 is open to a greater extent (fully, first bore section S1). This allows the gas a high flow rate and a more rapid rise in pressure downstream of the valve shutters.

When the control lever 8 is lifted up (active position) the actuating lever 9 may (or possibly must) likewise be lifted up (cf. FIG. 10). Of course, as an alternative, the actuating lever 9 could remain in the lowered position (closer to the body than the control lever 8 which is lifted up into the active position).

In this way, the two valve shutters 6, 7 can be controlled by one and the same movement transmission mechanism and notably at least one and the same mobile pushrod 18, 13.

This movement transmission mechanism may effect a translational movement by two different travels, one a short travel allowing a limited flow rate (second bore section S2), and the other a long travel allowing the full flow rate (first bore section S1).

Of course, the invention is not limited to the example of the figures described above. The two travels of the movement transmission mechanism may be controlled by cams that have rotary pins 21, 19 and are integral with the levers 8, 9 that are identical. The rotary pins may be coincident or distinct.

Preferably, the full (re-)closure of the two valve shutters 6, 7 may be effected in a single gesture, which allows the two valve shutters 6, 7 to be neutralized in the same manual action.

For example, a mechanism for coupling the movement of the control member 8 and of the actuator 9 can be incorporated into the cams 14, 15 of the levers.

For example, a pin 21 secured to at least one cam 14 may be housed in at least one groove that is formed in the other cam 15 and accommodates and guides the pin 21.

Thus, the movement of the control lever 8 toward its rest position also causes the return of the actuating lever 9 toward its locked position.

Conversely, when the locking lever 9 has been lifted up into its unlocked second position, the movement of the control lever 8 toward its active (for example lifted-up) position may also cause the locking lever 9 to move (to be lifted up for example into the position in FIG. 10).

Of course, the invention is not limited to the examples above. For example, the locking mechanism could be incorporated into the cams 14, 15 via a system of pins 21 and grooves of the same type as that of the coupling mechanism. Similarly, this locking mechanism for the control member 8 could be located elsewhere on the valve. In addition, this locking mechanism could be of the magnetic and/or pneumatic and/or electromechanical and/or hydraulic type.

According to one possible embodiment, lifting-up of the locking lever 9 thus allows the lever 8 to be unlocked, possibly associated with partial opening of the circuit.

This configuration affords a dual safety feature: 1) the need for unlocking, limiting untimely openings, 2) the unlocking partially opens the circuit 3, thereby starting the process of progressive opening and alerting the user to the presence of gas at the outlet.

This makes it possible to reduce the pressure spike downstream by slowing the rate of pressurization of the downstream chamber of the gas circuit connected to the outlet 5 of the valve 1.

Figure 4:
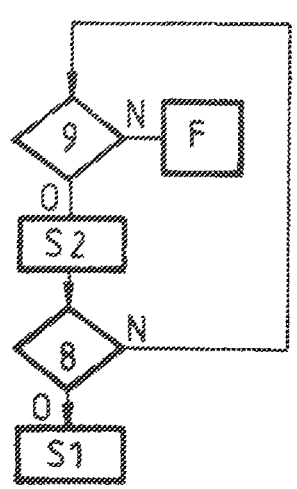
FIG. 4 shows a schematic and partial view illustrating one possible and optional example of the principle of operation of the valve.

FIG. 4 schematically illustrates the operation of this advantageous but optional possible feature. If the locking lever 9 is not activated (N) (that is to say if it is in its locked first position), the circuit 3 is closed (F). If the locking lever 9 is activated toward its unlocked second position (O), the circuit 3 is open to a degree of opening S2, which then allows the lever 8 to be actuated. Actuation of the control lever 8 (O) then allows the circuit to be fully opened (S1). Otherwise (N), the valve 1 returns to its closed or open position depending on the position of the actuator 9.

Preferably, the direction of actuation of the actuator 9 is identical (for example translation/rotation away from the body 2) to the direction of actuation of the control lever 8 (control lever 8 pulled up away from the body). The same is true of the return to the rest and locked positions (toward the body 2).

Also preferably, the locking lever 9 is monostable, meaning that the user has to maintain the force thereon (keep it lifted up) in order to keep the travel active, otherwise it returns automatically to its locked first position (circuit 3 closed).

For this purpose, the valve 1 may have a return member 12 returning the actuator 9 toward its locked first position (notably a spring), cf. FIGS. 2 and 3. Alternatively or in addition, the return member returning the locking lever 9 toward its locked first position may comprise or consist of the pressure of the fluid in the circuit. In other words, the service pressure of the gas in the circuit may apply to the locking lever 9 a force that tends to return it to its first position.

However, it is possible to provide a third stable position. For example, if the locking lever 9 accompanies the control lever 8 into its active position (cf. for example FIG. 10), the lever 9 could also have a stable position in this third position.

The control lever 8 may for its part have a bi-stable travel. In other words, its rest position (FIG. 5) and active position (FIG. 10) may be stable. For example, a hard-point stop mechanism (cam profile of the lever 8) provides these stable positions. The user may release the control lever 8 in the active position without this causing the circuit 3 to close.

Preferably, the closing of the circuit 3 (from a wide-open position S1) is achieved in a single gesture. Preferably, the control lever 8 and the actuator 9 are moved together into the initial position (circuit closed) via a coupling mechanism that couples the movement of the control member 8 and of the actuator 9. For example, this coupling mechanism automatically urges the actuator 9 toward its first position when the control member 8 is moved from its active position toward its rest position (from the position in FIG. 10 toward the position in FIG. 5).

Preferably, the two members 8, 9 can be manipulated with a single hand (in the direction of opening and/or in the direction of closing of the circuit).

Thus, when the locking lever 9 is actuated (pulled), a cam 15 of this lever 9 may move the first valve shutter 6 via a movement transmission mechanism. The movement transmission mechanism may notably comprise one or more pushrods 13, 18 in series (and/or in parallel), or an elastic member 12 (notably a spring to compensate for lash and/or to maintain contact in a drivetrain transmitting movement between the cam 15 and the valve shutter 6). Any other movement transmission mechanism may be envisioned. Reference may be made for example to the document FR2828922A1.

It will therefore be appreciated that, while being simple and inexpensive in structure, the invention affords numerous advantages.

In instances in which the actuation of the unlocking lever 9 brings about partial opening of the circuit, this valve structure also allows the user to have other functionalities. Thus, brief actuation of the actuator 9 alone allows the user to generate a jet of gas that is sufficient and controlled for purging/cleaning the downstream part of the circuit 3 and notably the outlet connector. This is notably a measure recommended by valve manufacturers.

The invention applies for example to lever-operated valves or taps that can be opened by lifting (or pushing) the main isolating lever for cylinder(s) of pressurized fluid (gas or gas mixtures notably), having for example a water volume of between 5 and 50 liters.

It will be understood that many additional changes in the details, materials, steps and arrangement of parts, which have been herein described in order to explain the nature of the invention, may be made by those skilled in the art within the principle and scope of the invention as expressed in the appended claims. Thus, the present invention is not intended to be limited to the specific embodiments in the examples given above.

The invention claimed is:

1. A device for storing and dispensing pressurized fluid, comprising a gas reservoir provided with a valve comprising a body having a front face and a rear face and housing an internal fluid circuit having an upstream end configured to be placed in communication with a reserve of pressurized fluid and a downstream end configured to be placed in communication with a user of fluid, the circuit comprising a collection of valve shutter(s) comprising at least one shutoff valve shutter for closing or opening the circuit, the valve comprising a member for manually controlling the collection of valve shutter(s), the control member being mounted on the body so as to be movable between a rest position, in which the collection of valve shutter(s) is in a position in which the circuit is closed, and an active position, in which the control member actuates the collection of valve shutter(s) into a position in which the circuit is open with a first bore section, the valve having a mechanism for locking the control member in the rest position, the locking mechanism comprising a locking lever provided with an end for grasping, the locking lever being able to move on the body between a locked first position, which locks the control member thereby preventing movement from the rest position toward the active position, and an unlocked second position, in which the control member is unlocked, thereby allowing movement from the rest position toward the active position, wherein, in the locked first position of the locking lever, the end for grasping of the locking lever is disposed along or in a manner facing the front face of the body of the valve at a first distance from the front face of the body of the valve, in the unlocked second position of the locking lever, the end for grasping is spaced apart from the front face of the body of the valve by a second distance greater than the first distance, the body of the valve having a concealing portion for concealing at least the end for grasping of the locking lever, forming a barrier between the rear face of the body of the valve and the end for grasping of the lever, in order to prevent or limit the possibility of a rectilinear object being able to push the locking lever from the locked position toward the unlocked position from the rear of the valve at the end for grasping, wherein, in the unlocked second position, the locking lever actuates the collection of valve shutter(s) into a position in which the circuit is open with a second bore section, and a protective bonnet for protecting the valve that is disposed around the valve, the bonnet comprising at least one rear opening for accessing the valve via its rear face, wherein, in the first position of the locking lever, direct access to the end for grasping of the lever via the rear opening with a rectilinear object is possible through a window defined by a direction offset by an angle of between 20 and 60° with respect to the front/rear direction of the valve, said window having a width (l) less than or equal to 3 cm.

2. The storage device as claimed in claim 1, wherein the rear face of the concealing portion is curved or inclined in the direction of the front face of the valve nearer to one lateral end of the body of the valve.

3. The storage device as claimed in claim 1, wherein the rear face of the end for grasping of the locking lever is curved or inclined in the direction of the front face of the valve nearer to the lateral end of the valve, in order to laterally deflect the rectilinear object that might impinge on the locking lever from behind at the end for grasping of the locking lever.

4. The storage device as claimed in claim 1, wherein the concealing portion is in one piece with a portion of the body of the valve delimiting the internal circuit and/or is formed by a shell attached to the portion of the body of the valve delimiting the internal circuit.

5. The storage device as claimed in claim 1, wherein the control member comprises at least one of the following: a lever articulated to the body, a push-button to be moved in translation, a rotary actuator such as a handwheel or a knob.

6. The storage device as claimed in claim 5, wherein the control member comprises a lever articulated to the body and comprising an end for grasping, wherein, in the rest position, the end for grasping of the control member is disposed along or in a manner facing the front face of the body of the valve, in the active position, the end for grasping of the control member is spaced apart from the body of the valve, and wherein, when the control member is in the rest position and the locking lever is in the first position, the ends for grasping of the control member and of the locking lever are adjacent to one another.

7. The storage device as claimed in claim 6, wherein the control member and the locking lever are articulated about respective, distinct or coincident rotary pins.

8. The storage device as claimed in claim 6, wherein the control member and the locking lever are articulated about parallel rotary pins, and in that the control member and the locking lever move in rotation in one and the same plane or in parallel adjacent planes.

9. The storage device as claimed in claim 6, wherein, when the control member is in the rest position and the locking lever is in the first position, a portion of the locking lever is situated between the front face of the body of the valve and a portion of the control member, wherein, in the front/rear direction of the valve, the locking lever is partially concealed by the control member except for the portion for grasping.

10. The storage device as claimed in claim 1, wherein the second bore section is smaller than the first bore section.

11. The storage device as claimed in claim 1, wherein the collection of valve shutter(s) has two distinct shut-off valve shutters that are able to move with respect to respective seats and, in the open position, respectively define the two distinct bore sections, the two valve shutters being controlled by the control member and the locking lever, respectively.

12. The storage device as claimed in claim 1, further comprising a return member for returning the locking lever toward the locked first position.

13. The storage device as claimed in claim 1 wherein, when the locking lever is in the first position, the distance of direct access to the end for grasping of the lever through the rear opening is between 5 cm and 20 cm.

\* \* \* \* \*